(12) United States Patent
Husemann et al.

(10) Patent No.: US 9,365,748 B2
(45) Date of Patent: Jun. 14, 2016

(54) CARRIER REINFORCED HEAT ACTIVATED ADHESIVE COMPOUNDS

(75) Inventors: Marc Husemann, Hamburg (DE); Matthias Koop, Norderstedt (DE)

(73) Assignee: TESA SE, Norderstedt (DE)

( * ) Notice: Subject to any disclaimer, the term of this patent is extended or adjusted under 35 U.S.C. 154(b) by 708 days.

(21) Appl. No.: 13/146,709

(22) PCT Filed: Jan. 18, 2010

(86) PCT No.: PCT/EP2010/050497
§ 371 (c)(1),
(2), (4) Date: Sep. 28, 2011

(87) PCT Pub. No.: WO2010/086244
PCT Pub. Date: May 8, 2010

(65) Prior Publication Data
US 2012/0027986 A1    Feb. 2, 2012

(30) Foreign Application Priority Data

Jan. 30, 2009    (DE) .......................... 10 2009 006 935

(51) Int. Cl.
*C09J 7/04*    (2006.01)
*B32B 27/12*    (2006.01)
(Continued)

(52) U.S. Cl.
CPC ................. *C09J 7/043* (2013.01); *B32B 5/022* (2013.01); *B32B 5/145* (2013.01); *B32B 27/12* (2013.01);
(Continued)

(58) Field of Classification Search
CPC ...... B32B 27/12; B32B 7/12; C09J 2201/128; C09J 2201/61; C09J 2400/263; C09J 7/043; Y10T 156/10; Y10T 428/2395

USPC ......... 156/60; 428/40.1, 85, 91, 96, 102, 103, 428/113, 137, 343, 346, 354; 442/59, 64, 442/65, 149, 150, 327
See application file for complete search history.

(56) References Cited

U.S. PATENT DOCUMENTS 1,415,538 A  *  5/1922  Fehring .......................... 116/45
2,108,425 A  *  2/1938  Bassett .......................... 73/277
(Continued)

FOREIGN PATENT DOCUMENTS

DE      199 31 214 A1    1/2001
DE      101 12 375 A1    9/2002
(Continued)

OTHER PUBLICATIONS

Donatas Satas, Handbook of Pressure Sensitive Adhesive Technology (van Nostrand, 1989).
(Continued)

*Primary Examiner* — Arti Singh-Pandey
(74) *Attorney, Agent, or Firm* — Norris McLaughlin & Marcus, P.A.

(57) ABSTRACT

The invention relates to an adhesive film comprising a fleece carrier (T) and two layers made of heat activated adhesive compounds (1, 2) arranged on both sides of the fleece carrier, characterized in that both adhesive compounds (1, 2) are permeated in the fleece carrier (permeation regions T1 and T2) such that a total of between 20% and 92% of the fiber intermediate volume of the fleece carrier (T) is saturated by the adhesive compound, providing that the adhesive compounds (T1, T2) permeated on both sides of the fleece carrier (T1, T2) each make up at least 10% of the fiber intermediate volume of the fleece carrier (T) in the composition.

9 Claims, 3 Drawing Sheets

(51) Int. Cl.
*B32B 5/02* (2006.01)
*B32B 5/14* (2006.01)
*B32B 27/18* (2006.01)
*B32B 27/20* (2006.01)
*B32B 27/32* (2006.01)
*B32B 27/34* (2006.01)
*B32B 27/36* (2006.01)
*B32B 27/38* (2006.01)
*B32B 27/40* (2006.01)
*B32B 27/42* (2006.01)

(52) U.S. Cl.
CPC ............... B32B 27/18 (2013.01); B32B 27/20 (2013.01); B32B 27/32 (2013.01); B32B 27/34 (2013.01); B32B 27/36 (2013.01); B32B 27/38 (2013.01); B32B 27/40 (2013.01); B32B 27/42 (2013.01); *B32B 2260/021* (2013.01); *B32B 2260/046* (2013.01); *B32B 2262/02* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/06* (2013.01); *B32B 2262/062* (2013.01); *B32B 2262/08* (2013.01); *B32B 2262/10* (2013.01); *B32B 2262/101* (2013.01); *B32B 2262/108* (2013.01); *B32B 2270/00* (2013.01); *B32B 2307/30* (2013.01); *B32B 2307/50* (2013.01); *B32B 2405/00* (2013.01); *C09J 2201/128* (2013.01); *C09J 2201/61* (2013.01); *C09J 2400/263* (2013.01); *Y10T 156/10* (2015.01); *Y10T 428/2395* (2015.04)

(56) References Cited

U.S. PATENT DOCUMENTS

| | | | | |
|---|---|---|---|---|
| 3,391,056 | A | * | 7/1968 | Robinson, Jr. .................. 442/65 |
| 4,985,297 | A | * | 1/1991 | Tamaru et al. .................. 442/65 |
| 6,818,093 | B1 | * | 11/2004 | Taal et al. ..................... 156/327 |
| 6,872,279 | B1 | * | 3/2005 | Kolowrot et al. ............. 156/334 |
| 2002/0146952 | A1 | | 10/2002 | Kulper et al. |
| 2008/0138617 | A1 | | 6/2008 | Takahashi et al. |

FOREIGN PATENT DOCUMENTS

| | | |
|---|---|---|
| EP | 1 930 387 A2 | 6/2008 |
| GB | 2 108 425 A | 5/1983 |
| JP | 51 028834 A | 3/1976 |
| JP | 2002 327362 A | 11/2002 |
| JP | 2008 143970 A | 6/2008 |

OTHER PUBLICATIONS

Translation of Official Action issued in corresponding Japanese Application 2011-546762 mailed Dec. 24, 2014.
Shanghai Fortune International Trade Co. Ltd., Stainless Steel Panels, SUS316, website shfortune.manufacturer.globalsources.com, Nov. 13, 2014.

* cited by examiner

CARRIER REINFORCED HEAT ACTIVATED ADHESIVE COMPOUNDS

This application is a 371 of PCT/EP2010/050497, filed Jan. 18, 2010, which claims foreign priority benefit under 35 U.S.C. §119 of the German Patent Application No. 10 2009 006 935.6 filed Jan. 30, 2009, the disclosures of which are incorporated herein by reference.

The invention relates to an adhesive sheet comprising a fleece carrier and two layers of heat-activatable adhesives, more particularly for the bonding of metal parts to plastic, glass or metal.

For the adhesive bonding of metal parts to plastics, glasses or metals it is common to use double-sided pressure-sensitive adhesive tapes. The bond strengths which can be achieved with such tapes are in many cases satisfactory for the fixing and attachment of the metal components to the various substrates. Examples of metals used include aluminum, magnesium, steel, stainless steel, and steel with chromations. Plastics bonded are, for example, acrylonitrile-butadiene-styrene (ABS) copolymers, polycarbonates (PC), polypropylene adipates (PPA), polyamides (PA), polymethyl methacrylate (PMMA), polyvinyl chloride (PVC) or blends based on these plastics.

For portable consumer electronics articles in particular, however, there is a continual increase in the requirements. On the one hand, these articles are being made increasingly smaller, and so the bonding areas as well are therefore becoming ever smaller. On the other hand, increasingly, additional requirements are being imposed on the adhesive bond, since portable devices are used across a relatively wide temperature range and are required, moreover, to withstand mechanical loads, from impacts or drops, for instance.

These stipulations are particularly problematic for metal-metal bonds and metal bonds to plastics. In the event of a drop, plastic is able to absorb some of the energy, whereas rigid metal parts are able to dissipate only a little energy. Moreover, the trend is toward increasingly harder plastics and/or plastics reinforced with glass fibers, and these plastics, although more stable, have a lower shock absorption capacity; the same applies to glasses. In these cases, the adhesive tape is required to absorb a large part of the energy introduced.

Furthermore, particularly in the case of the adhesive bonding of different materials to one another, a problem is presented by the different coefficients of thermal expansion. For instance, in the event of rapid temperature changes, stresses may appear between the components. One possibility for improving the properties of the devices in relation to the problems identified above lies in the use of heat-activatable sheets for the adhesive bonding.

Heat-activatable adhesives can be distinguished in principle into two categories:
a) thermoplastic heat-activatable adhesives, more particularly sheets
b) reactive heat-activatable adhesives, more particularly sheets The term "heat-activatable adhesive" (also referred to in the literature as "thermally activatable adhesive") identifies adhesives which are activated by supply of thermal energy and optionally, but typically, exposure to pressure. Application may take place in particular from the melt or, at relatively low temperatures, in sheet form, with the fixing (adhering) of the sheet to the substrate taking place with heating and optionally under pressure.

On cooling, the adhesive bond is produced, with a distinction to be made in particular between two systems: thermoplastic heat-activatable systems (hotmelt adhesives) set physically (usually reversibly) on cooling, whereas heat-activatable elastomer/reactive-component systems set chemically (and usually irreversibly).

By adding reactive components to thermoplastic heat-activatable systems it is also possible here to produce chemical setting, which may also take place in addition to the physical setting.

Heat-activatable adhesives are frequently provided in sheet form, being nontacky at room temperature (owing to the more or less fixed properties of the heat-activatable adhesives at room temperature, they can generally be produced both as carrier-containing and as carrier-free systems). As a result of this, the adhesive can be adapted to the shape of the bond site even prior to bonding (for example, through the provision of sheet diecuts which match the shape of the bond site). Through supply of thermal energy and, optionally, additional exposure to pressure, the bond is produced, as set out above.

Adhesive sheet systems based on heat-activatable adhesives that are used for these applications in accordance with the prior art have a number of drawbacks. In order to achieve high shock resistance (in the event that the cell phone falls to the ground), relatively soft and elastic thermoplastics are used for bonding. The softness and elasticity give these thermoplastic sheets relatively poor diecutting qualities.

A further drawback of the thermoplastics is likewise manifested in the hot bonding procedure. Owing to the sharp decrease in viscosity as a result of the exposure to thermal energy, the bonding operation under pressure is accompanied by unwanted squeezing of the plastified material out of the joint. This is usually accompanied by a decrease in thickness and by deformation of the sheet.

There is therefore demand for a—preferably thermoplastically—heat-activatable adhesive system which has good application properties, exhibits little or no squeeze-out behavior in use, even under the influence of pressure, and in the bonded state ensures very good shock absorption and a mechanical stress compensation. The object of the present invention is to present such a system.

The object is achieved by means of an adhesive sheet comprising a fleece carrier and, arranged on the two sides of the fleece carrier, two layers of heat-activatable adhesives, which is distinguished in that both adhesives have penetrated the fleece carrier such that a total of between 20% and 92% of the fiber interstitial volume of the fleece carrier in the adhesive sheet assembly is saturated with the adhesive (degree of saturation of between 20% and 92%), with the proviso that the adhesives penetrated on the two sides of the fleece carrier each make up at least 10% of the fiber interstitial volume of the fleece carrier in the adhesive sheet assembly.

The fiber interstitial volume of the fleece carrier is the total volume of the fleece carrier (impregnated and nonimpregnated regions) in the adhesive sheet assembly, minus the volume of the fleece fibers.

The adhesive sheet assembly is the assembly composed of the fleece carrier and the two heat-activatable adhesive layers, more specifically, unless indicated otherwise, in the unbonded state (i.e., in the presentation state; after use there is a reduction both in the thickness and in the volume of the adhesive assembly, owing to the compression of the substrates).

The volume of adhesive penetrating the fleece carrier amounts in accordance with the invention to at least 20%, preferably at least 40%, more preferably at least 50%, and not more than 92%, preferably not more than 80%, of the fiber interstitial volume of the fleece carrier in the adhesive sheet.

The volume of the region of the fleece carrier not impregnated with adhesives amounts, accordingly, to 8% to 80%, preferably 20% to 60%, of the fiber interstitial volume of the fleece carrier in the adhesive sheet assembly.

In accordance with the invention, the volume of the adhesives penetrated on the sides of the fleece carrier is in each case at least 10% of the fiber interstitial volume of the carrier material, more preferably at least 20%. The greater the amount of adhesive that has penetrated at the carrier surfaces, the better the anchoring of the layers of adhesive on the carrier.

BRIEF DESCRIPTION OF THE DRAWINGS

The invention will now be described in greater detail with reference to the drawings, wherein.

Figure 1:
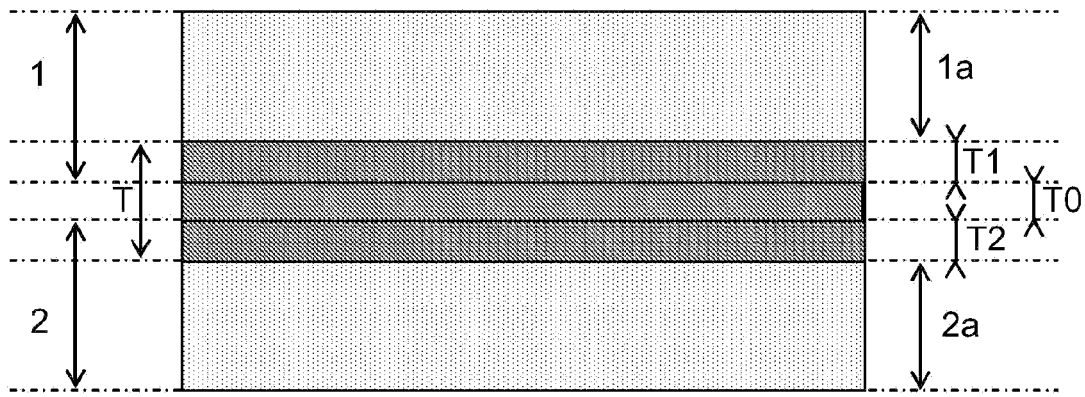
FIG. 1 shows one embodiment of an adhesive sheet according to the present invention.
Figure 2:
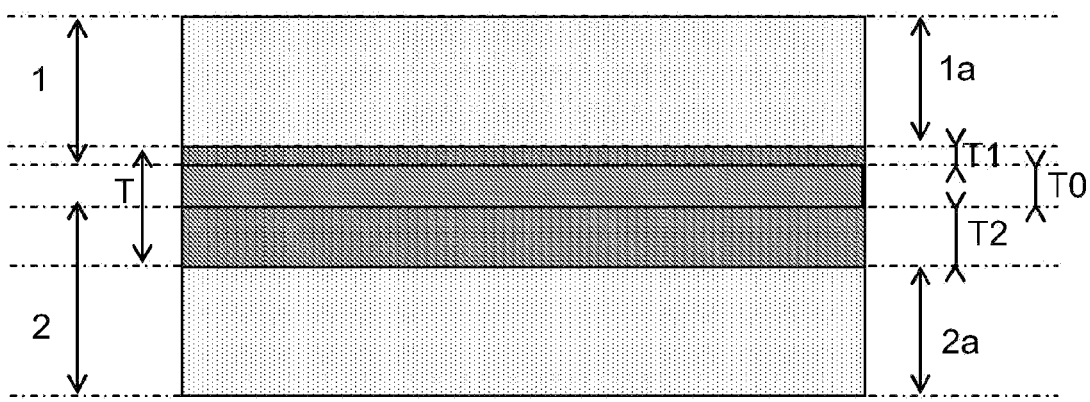
FIG. 2 shows another embodiment of an adhesive sheet according to the present invention.

The inventive principle of the subject matter of the invention is shown diagrammatically by FIGS. 1 and 2, without any intention that the product construction depicted therein should impose any unnecessary restriction.

The adhesive sheet of the invention comprises a fleece carrier T and two layers of heat-activatable adhesives 1 and 2, which form the surfaces of the heat-activatable adhesive sheet. Both layers of adhesives, 1 and 2, have penetrated at the carrier surface into the fleece carrier T, thus producing two adhesive-impregnated regions T1 and T2 of the carrier T (also referred to below as penetration regions T1 and T2; T1 denotes the carrier region impregnated with adhesive 1, and T2 the carrier region impregnated with adhesive 2). Between the impregnated carrier regions T1 and T2 a region T0 is to remain, in accordance with the invention, that is not impregnated with adhesive.

On the outside of the adhesive sheet there remain two layers of adhesive, 1a and 2a, which lie outside the carrier material.

In actual fact, at the boundaries between the penetration region T1 and the unimpregnated region T0, and also between the penetration region T2 and the unimpregnated region T0, there is a more or less sharp transition from fully impregnated carrier material to unimpregnated carrier material. Moreover, the boundary will only be more or less planar, a fact attributable inter alia to fluctuations in the compaction of the fibers of the fleece material. The actual profile of the boundaries is dependent here on factors including the nature of application of the adhesives to the carrier and the conditions accompanying said application. The percentage figures given above in relation to the penetration regions should be understood as carrying a margin of error of this kind. With preference in accordance with the invention, as an idealized embodiment, the aim is for an adhesive tape in which the penetration regions T1 and T2 are impregnated completely, and the unimpregnated carrier region T0 not at all, with adhesive, and in which the boundaries with particular preference have a planar profile.

Generally speaking, it is possible to assume that the distribution of the fibers in the fleece material is largely homogeneous. The invention further provides an adhesive sheet comprising a fleece carrier and, arranged on both sides of the fleece carrier, two layers of heat-activatable adhesives, where both adhesives have penetrated the fleece carrier in such a way that a total of between 20% and 92%, preferably between 40% and 80%, of the layer thickness of the fleece carrier in the adhesive sheet assembly is saturated with the adhesive, with the proviso that on both sides of the fleece carrier in each case at least 10% of the fleece carrier thickness is saturated.

The percentage figures here are based on planarly normalized boundaries between the impregnated regions and the unimpregnated region of the fleece carrier.

Within the carrier fleece there is preferably a strip with a thickness of 8% to 80% of the layer thickness of the carrier fleece, more particularly of 20% to 60% of the layer thickness of the carrier fleece, that is not saturated with one of the adhesives.

In one preferred embodiment of the invention, the carrier fleece T is saturated symmetrically, i.e., the depths of penetration (thicknesses of the penetration regions T1 and T2) on the top and bottom sides are the same. An embodiment of this kind is shown diagrammatically and by way of example in FIG. 1.

Differences in the depth of penetration may come about, for example, through the carrier fleece structure and/or the procedural regime during the application of the adhesives. A further advantageous embodiment of the invention therefore has penetration regions (T1, T2) that are different in thickness. FIG. 2 shows, diagrammatically, one such embodiment of the invention.

Unless otherwise indicated or evident from the context, all details relating to the adhesive sheet of the invention refer to both embodiments described. The term "adhesive sheet" is intended, in the context of this specification, to encompass all sheetlike structures, including, for example, adhesive tapes, hence more particularly those in which the longitudinal direction and the extent in transverse direction relative to the longitudinal direction is significantly greater than the thickness of the structure.

The region T0 of the fleece carrier T that is not impregnated with adhesive preferably constitutes a continuous region, i.e., is not composed of a plurality of separated volume regions.

For the heat-activatable adhesives of the invention it is possible in principle to use not only thermoplastic heat-activatable systems but also heat-activatable elastomer/reactive-component systems. Double-sidedly thermoplastic heat-activatable systems, however, are very preferred, since these systems are more suitable for the intended fields of use of the heat-activatable adhesive sheets of the invention, and in particular embrace a greater use range.

It is also possible to produce systems which are furnished on one side with a thermoplastic heat-activatable adhesive and on the other side with a heat-activatable elastomer/reactive-component adhesive.

In one preferred embodiment of the invention, the heat-activatable adhesive 1 on one side of the fleece carrier and the heat-activatable adhesive 2 are the same, but they may also be selected independently of one another. Hence the coatings on the other side of the fleece carrier may be chemically identical, chemically similar (for example, the same chemical basis, but different average molecular weights and/or additives), or else chemically different (for example, different chemical basis).

Heat-Activatable Thermoplastics

The heat-activatable adhesives of the adhesive sheet of the invention are based very preferably on thermoplastic polymers. Thermoplastic For Use as Heat-activatable adhesive these systems are familiar in the prior art.

For the invention it is possible in principle to use all amorphous and semicrystalline thermoplastics which under heat activation are suitable for the adhesive bonding of metal parts to plastics, metal parts or glasses.

In one preferred procedure, thermoplastics are used that have a softening temperature of at least 85° C. and not more than 150° C. The application weight of the thermoplastics is preferably between 10 and 250 g/m$^2$, more preferably between 20 and 150 g/m$^2$. The figures refer in each case to one side of the coated carrier fleece.

Suitable thermoplastic polymers as a basis for the heat-activatable adhesives are, for example and nonconclusively, polyesters, copolyesters, polyamides, copolyamides, thermoplastic polyurethanes, and polyolefins [for example, polyethylene (commercially available example: Hostalen®, Hostalen Polyethylen GmbH), polypropylene (commercially available example: VestolenP®, DSM)].

It is also possible, furthermore, to use blends of different thermoplastics, more particularly of the aforementioned polymers.

In a further embodiment, poly-α-olefins are used. From the company Degussa, under the trade name Vestoplast™, various heat-activatable poly-α-olefins are available commercially.

In the simplest variant, the adhesive is composed only of the thermoplastic component. Advantageous developments, however, are characterized by additization with further constituents.

For optimizing the technical adhesive properties and the activation range it is possible, optionally, to add bond strength-enhancing resins or reactive resins. The fraction of the resins is between 2% and 30% by weight, based on the thermoplastic or on the thermoplastic blend.

Tackifying resins for addition that can be used include, without exception, all tackifier resins that are already known and that have been described in the literature. Representatives include the pinene resins, indene resins, and rosins, their disproportionate, hydrated, polymerized, and esterified derivatives and salts, the aliphatic and aromatic hydrocarbon resins, terpene resins and terpene-phenolic resins, and also C5, C9, and other hydrocarbon resins. Any desired combinations of these and further resins may be used in order to adjust the properties of the resultant adhesive in accordance with requirements. Generally speaking, it is possible to employ all resins that are compatible (soluble) with the polyacrylate in question; more particularly, reference may be made to all aliphatic, aromatic, and alkylaromatic hydrocarbon resins, hydrocarbon resins based on pure monomers, hydrogenated hydrocarbon resins, functional hydrocarbon resins, and natural resins. Reference may be made expressly to the description of the state of knowledge in the "Handbook of Pressure Sensitive Adhesive Technology" by Donatas Satas (van Nostrand, 1989).

In a further embodiment, reactive resins are added to the thermoplastic. One very preferred group comprises epoxy resins. The molecular weight of the epoxy resins varies from 100 g/mol up to a maximum of 10 000 g/mol for polymeric epoxy resins.

The epoxy resins comprise, for example, the reaction product of bisphenol A and epichlorohydrin, the reaction product of phenol and formaldehyde (Novolak resins) and epichlorohydrin, glycidyl esters, the reaction product of epichlorohydrin and p-aminophenol.

Preferred commercial examples are, for example, Araldite™ 6010, CY-281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 828, 830, 834, 836, 871, 872, 1001, 1004, 1031 etc. from Shell Chemical, and HPT™ 1071, and HPT™ 1079 likewise from Shell Chemical.

Examples of commercial aliphatic epoxy resins are, for example, vinylcyclohexane dioxides, such as ERL-4206, ERL-4221, ERL 4201, ERL-4289 or ERL-0400 from Union Carbide Corp.

As Novolak resins it is possible, for example, to make use of Epi-Rez™ 5132 from Celanese, ESCN-001 from Sumitomo Chemical, CY-281 from Ciba Geigy, DEN™ 431, DEN™ 438, Quatrex 5010 from Dow Chemical, RE 305S from Nippon Kayaku, Epiclon™ N673 from DaiNippon Ink Chemistry or Epicote™ 152 from Shell Chemical.

Furthermore, reactive resins used may also include melamine resins, such as Cymel™ 327 and 323 from Cytec, for example.

As reactive resins it is additionally possible to use terpene-phenolic resins as well, such as Nirez™ 2019 from Arizona Chemical, for example.

It is also possible, furthermore, as reactive resins to use phenolic resins, such as, for example, YP 50 from Toto Kasei, PKHC from Union Carbide Corp., and BKR 2620 from Showa Union Gosei Corp.

As reactive resins it is also possible, moreover, to use polyisocyanates, such as, for example, Coronate™ L from Nippon Polyurethane Ind., Desmodur™ N3300 or Mondur™ 489 from Bayer.

It is possible optionally, furthermore, for fillers (for example fibers, carbon black, zinc oxide, titanium dioxide, chalk, solid or hollow glass beads, microbeads of other materials, silica, silicates), pigments, dyes, nucleators, expandants, compounding agents and/or aging inhibitors, in the form, for example, of primary and secondary antioxidants or in the form of light stabilizers, to be added.

Carrier Fleece

As carrier fleece, sheetlike structures made of individual fibers are used. In the context of the carrier fleece it is possible to use all nonwoven webs defined in accordance with the standard DIN EN 29092. The fleece is composed of fibers laid loosely together which have not yet been joined to one another. The strength results from the adhesion inherent in the fiber. A distinction is also made between consolidated and nonconsolidated fleeces. The fibers are randomly distributed. The fleeces can be differentiated according to the fiber materials. Fiber materials used may be mineral fibers, such as, for example, glass, mineral wool or basalt, animal fibers, such as, for example, silk or wool, plant fibers, such as, for example, cotton, cellulose, chemical fibers, such as, for example, polyamide, polypropylene, polyphenylene sulfide, polyacrylonitrile, polyimide, polytetrafluoroethylene, aramide or polyesters. The fibers may be consolidated mechanically by needling or by water jets, chemically by addition of binders, or thermally by softening in a suitable gas stream, between heated rollers or else in a stream of steam.

The choice of the fiber materials is made according to the temperature stability. For the polymer-based fibers, accordingly, polymers are selected whose softening temperature is preferably at least 20° C., more preferably at least 40° C., above the softening temperature of the thermoplastic heat-activatable sheet.

One preferred embodiment of the invention uses cellulose-based fleeces. The basis weight of the fleeces is preferably between 4 and 100 g/m$^2$, more preferably between 10 and 70 g/m$^2$. Fleeces of this kind are available commercially, for example, from the company Glatfelter. The thickness of the fleeces used in accordance with the invention, prior to being imbedded into the adhesive sheet assembly, hence in the free form, is preferably between 20 and 100 μm, very preferably between 30 and 60 μm.

In the course of furnishing and impregnation with the heat-activatable adhesives, there is a reduction in the thickness of the fleece carrier, as a result in particular of compression, and so the thickness of the fleece carrier in the adhesive sheet assembly is generally lower than the thickness of the free fleece carrier.

Method

The coating of the thermoplastic film takes place preferably from the melt. In order to ensure homogeneous mixing of the thermoplastic polymers, the optionally added resins and/or further fillers, it may be necessary to carry out a separate compounding operation beforehand. This mixing operation may take place, for example, in a twin-screw extruder or kneading apparatus. For the coating of pure (not blended) thermoplastics or of the pre-compounded mixtures, a single-screw extruder is generally sufficient. Here, the extrudate is heated in stages to the extrusion temperature, i.e., plastified by a heating procedure. The temperature selection takes place with regard to the melt flow index (MFI) or melt volume rate (MVR) of the thermoplastics employed.

For the coating operation it is possible in general to distinguish between the contact methods and the contactless methods. Both methods can be carried out in accordance with the invention in principle. For extrusion coating it is preferred to use an extrusion die (slot die), in which the film is shaped. This procedure is influenced by the die design within the coating die. The extrusion dies used may in particular originate from one of the following three categories: T-die, fishtail die, and coathanger die. The individual types differ in the design of their flow channel. Through these forms of the extrusion die it is possible to generate orientation within the hotmelt adhesive. Where two-layer or multilayer thermoplastic heat-activatable adhesives are to be prepared, it is also possible to use coextrusion dies.

Following emergence from the die, in one preferred procedure, coating takes place onto a temporary carrier, such as a siliconized release paper, for example. In the course of the coating operation, the thermoplastic heat-activatable adhesive may be oriented. The degree of orientation in this case is determined by factors including the ratio of die gap to film thickness. Orientation occurs whenever the layer thickness of the hotmelt adhesive film on the carrier material to be coated is smaller than the die gap.

For improving anchorage on the temporary carrier it may be necessary for the heat-activatable sheet to be applied electrostatically. In the subsequent step, the carrier fleece is laminated onto the heat-activatable adhesive. The operation takes place under hot conditions. It may therefore be necessary to heat the heat-activatable sheet prior to lamination. This can be done, for example, by IR lamps or heating rolls. In one preferred procedure, the laminating temperature of the heat-activatable adhesive is in the range of the softening temperature of the heat-activatable adhesive, or above. Through the choice of temperature and of laminating pressure it is possible to vary the depth of penetration into the carrier fleece.

In a second step, coating takes place on the opposite side. For this purpose it is possible to adopt a procedure analogous to that for the coating of the first step, with the first coating, consisting of release paper, heat-activatable adhesive, and carrier fleece, then being laminated under hot conditions onto the second coating. Alternatively, the second coating of the heat-activatable adhesive as well may be applied directly to the other side of the carrier fleece of the first coating. Again, the depth of penetration in the carrier fleece can be varied by the temperature and the laminating pressure. The rules that apply are the same as those applied for the first lamination.

In another embodiment, the thermoplastic heat-activatable sheet may be equipped not only with a temporary carrier material but also with two temporary carrier materials. This form of double release liner may be of advantage for the production of punched products (diecuts).

Adhesive Bonding

Metals

The metal components to be bonded may be manufactured, generally, from all common metals and metal alloys. Employed with preference are metals, such as, for example, aluminum, stainless steel, steel, magnesium, zinc, nickel, brass, copper, titanium, ferrous metals, and austenitic alloys. Additizations and alloyings of any kind are likewise customary. Moreover, the components may be of multi-ply construction, comprising different metals.

For optical reasons and in order to improve the surface properties and surface quality, surface modifications are frequently undertaken on the metal components. Thus, for example, brushed aluminum and stainless steel components are frequently employed. For aluminum and magnesium, anodization is customary, and is frequently combined with operations that impart color.

Metallizations employed, in addition to chromations, also include coatings with gold or silver, for example, for passivation.

Additionally customary are any kind of coatings with protective and/or colored coating materials, and also surface coatings applied by means of physical gas-phase deposition (PVD) or chemical gas-phase deposition (CVD).

The metal parts may take on any of a very wide variety of shapes and sizes, and may be flat or three-dimensionally shaped. The functions as well, moreover, may be very different, and range from decorative elements through reinforcing supports, frame components, coverings, etc.

The adhesive sheet of the invention is outstandingly suitable for the adhesive bonding of metal parts as described above.

Plastics Parts

The plastics parts for consumer electronics components are based often on plastics which can be processed by injection molding. Hence this group includes, for example, acrylonitrile-butadiene-styrene (ABS) copolymers, polycarbonates (PC), ABS/PC blends, PMMA, polyamides, glass fiber-reinforced polyamides, polyvinyl chloride, polyvinylene fluoride, cellulose acetate, cycloolefin copolymers, liquid-crystal polymers (LCP), polylactide, polyetherketones, polyetherimide, polyethersulfone, polymethacryl-methylimide, polymethylpentene, polyphenylene ether, polyphenylene sulfide, polyphthalamide, polyurethanes, polyvinyl acetate, styrene acrylonitrile copolymers, polyacrylates and polymethacrylates, polyoxymethylene, acrylic ester styrene-acrylonitrile copolymers, polyethylene, polystyrene, polypropylene or polyesters [for example, polybutylene terephthalates (PBT), polyethylene terephthalate (PET)].

The components may take on any desired form needed for the production of a component or casing for consumer electronics articles. In the simplest form, they are planar. Additionally, however, 3-dimensional components are also entirely customary. The components may also take on any of a very wide variety of functions, such as, for example, casings or viewing windows, or reinforcing element, etc.

The adhesive sheet of the invention is likewise outstandingly suitable for the adhesive bonding of plastics parts as described above.

Glasses

For window and display applications, the use of glasses is on the increase. These glasses may be manufactured, for example, from mineral glass, quartz glass or sapphire glass. Through various modifications it is possible to exert specific influence on the optical and also the physical properties of the glasses. For decorative reasons, for example, smoked glasses or colored glasses are employed.

With surface coatings or coating systems, which may be applied, for example, by spray application or via a gas-phase deposition procedure, it is likewise possible to exert a specific influence over the optical appearance. Furthermore, antireflection layers, scratch-resistance coatings, and other functional surface coatings are commonplace.

In their most simple form, the glasses take a planar form of flat glass, but may also have been cast into three-dimensional windows or components.

The adhesive sheet of the invention is additionally suitable outstandingly for the adhesive bonding of glasses as described above.

Process—Prelamination

For use in consumer electronics articles, the heat-activatable sheets are typically processed further to form diecuts. These diecuts are produced alternatively by a laser cutting method or by flat bed punching or by rotary punching. Also in existence are many further diecut production methods known to the skilled person.

The diecut typically has the dimensions of the metal part, but may also be somewhat smaller, in order to permit slight squeeze-out processes during the bonding operation. For constructional reasons, furthermore, it may also be necessary to use full-area diecuts.

In the simplest scenario, the diecut of the heat-activatable sheet is positioned manually without temporary carrier, as for example by means of tweezers, on the metal part or between the components that are to be joined.

In a further embodiment, the heat-activatable adhesive tape diecut, after positioning on the metal, is treated with a heat source, which causes an increase in the adhesion of the diecut to the metal. In the simplest scenario, the heat source used may be an IR lamp, an iron or a hotplate. For this operation it is of advantage if the diecut is still equipped with a temporary carrier material, in order to prevent sticking of the adhesive film to the tool or to the heat source.

In a further very common form, the metal part is placed onto the heat-activatable adhesive tape diecut. Placement takes place on the open side. The reverse side still carries the temporary carrier material. Subsequently, by means of a heat source, thermal energy (heat) is introduced through the metal into the thermoplastic, heat-activatable adhesive tape. As a result, the adhesive tape becomes tacky and adheres more strongly to the metal than to the release liner. It is heated by the metal.

Advantageously in accordance with the invention, the amount of heat introduced into the heat-activatable film in the course of prelamination is metered, and ought to be not more than 25° C. above the temperature needed in order to ensure secure adhesion of the film on the metal component.

For the introduction of the heat, in one preferred embodiment, a heating press is used. The ram of the heating press in this case is manufactured, for example, from aluminum, brass or bronze and is adapted in its shaping, in general, to the contours of the metal part or to the dimensions of the diecut. In order to prevent instances of local heat damage to the components, the ram may additionally be provided with partial cutouts.

Pressure and temperature are introduced as uniformly as possible, with preferably all of the parameters (pressure, temperature, time) being set as a function of the materials used (nature of the metal, metal thickness, nature of the thermoplastic heat-activatable sheet, etc.).

In order to ensure precise positioning of the diecut on the metal part, it is usual to use mold parts which are adapted to the contours of the components to be bonded, thereby preventing slipping. By means of guide pins in the mold part and corresponding guide holes in the temporary carrier material of the heat-activatable sheet, it is possible to ensure exact positioning between diecut and metal part. Other positioning facilities may likewise be realized.

Following heat activation, the metal part with the heat-activatable sheet laminated on is removed from the mold part.

The entire operation may also be converted to an automatic process.

Bonding Process

The bonding process between metal part and plastics, glass or metal component is described in detail by means of process steps 1 to 5 below.

1) Fixing of the plastics, glass or metal component to a mold component
2) Placement of the metal part to be bonded, with heat-activatable sheet (without temporary carrier), on the plastics, glass or metal component
3) Application of pressure and temperature by ram of heating press
4) Optional re-cooling step
5) Removal of the bonded components from the mold component The invention encompasses the adhesive bonding of metal components to plastics components, metal components to glasses, and metal components to other metal components, it being possible for the metals to have the same or a different chemical composition.

The mold component which serves to accommodate the plastics, glass or metal parts is composed in particular of heat-resistant material. Examples of such materials include metals. However, plastics as well can be used, such as fluorinated polymers, for example, or thermosets, which also have good hardness and are difficult to deform.

In process step 3, pressure and temperature are applied. This is accomplished by means of a heating ram, which consists of a material having good thermal conductivity. Typical materials are, for example, copper, brass, bronze, or aluminum. Other metals or alloys as well can be used, however. Furthermore, the heating press ram ought preferably to take on the shape of the top face of the metal part. This shape may in turn be of two-dimensional or three-dimensional kind. The pressure is customarily applied via a pneumatic cylinder. It need not necessarily be applied via air pressure, however. Also possible, for example, are hydraulic press devices or electromechanical actuating drives operating via spindles, for example. It may be advantageous, moreover, to introduce pressure and temperature a number of times, in order to increase the operational throughput by means, for example, of series connection or a rotation principle. In this case, the rams of the heating press need not all be operated at the same temperature and/or same pressure. Furthermore, the contact times of the rams may also be selected differently.

For the purposes of this invention, in process step 3, the thermoplastic, heat-activatable sheet has a reduced squeeze-out behavior. For given operational parameters (temperature, pressure, time), the squeezeout behavior is reduced by at least 10%, preferably by at least 20%, as compared with a heat-activatable adhesive sheet with the same construction and the same dimensions but with complete fleece saturation.

Diecuts designed in accordance with the invention do not predictably exhibit behavior optimized in this way.

As a result of the reduced squeezeout behavior, the diecut during bonding exhibits better mold stability, this being an advantage in particular in the bonding of visible components such as decorative elements, for example, since in that case unwanted residues of adhesive outside the actual joint cannot be tolerated, on optical grounds. Moreover, in the case of hot bonding sheets with low squeezeout propensity, the shape of the diecut (more particularly the area of the diecut) can be selected to be greater, since there is less space that needs to be allowed for the unwanted emergence of material. For the same reason, with these systems, it is also possible in many cases to do without interruptions within the diecuts or constructive solutions on the adherends themselves, which likewise serve to accommodate the unwanted emergence of adhesive.

The squeezeout behavior of the thermoplastic, heat-activatable sheet is defined by way of the squeezeout test (see Experimental section). Here, the squeezeout rate is determined under standard conditions.

The re-cooling step (process step 4) represents an optional process step and is used to optimize the bonding performance. Furthermore, it allows easier manual removal of the components. For re-cooling, it is usual to use a metallic press ram whose shape is analogous to that of the heating press ram but which has no heating elements and operates at room temperature. In rare cases, actively cooled press rams or cooling systems, which withdraw the heat from the component that is to be cooled, by means of a stream of air, are employed.

In the last process step, then, the bonded component is removed from the mold component.

The heating press rams for prelamination and bonding are operated preferably in a temperature range from 60° C. to 300° C., depending on the temperature stability of the components and also on the activation temperature or melting temperature of the thermoplastic, heat-activatable sheet. The process times run typically to 2.5 s to 15 s per press ram step. It may also be necessary, furthermore, to vary the pressure. As a result of very high pressures, the thermoplastic heat-activatable sheet may undergo increased squeezeout in spite of the properties according to the invention. Suitable pressures run to 1.5 to 10 bar, calculated on the basis of the bond area. Here again, the stability of the materials and also the flow behavior of the heat-activatable sheet have a great influence on the pressure that is to be selected.

EXPERIMENTAL VERIFICATION

Test Methods

Bond Strength (A)

Figure 3A:
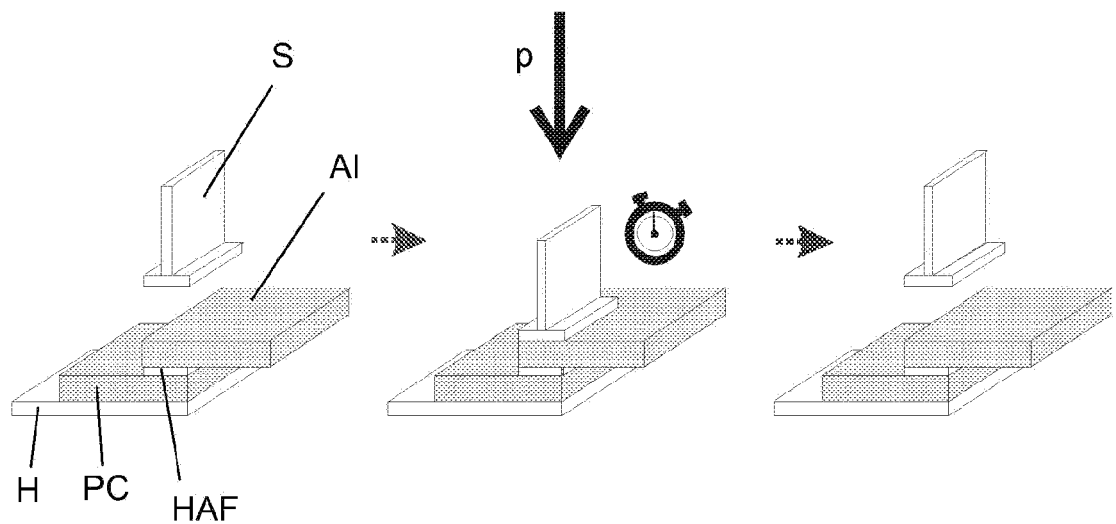
FIGS. 3a and 3b depict a dynamic shearing test.
Figure 3B:
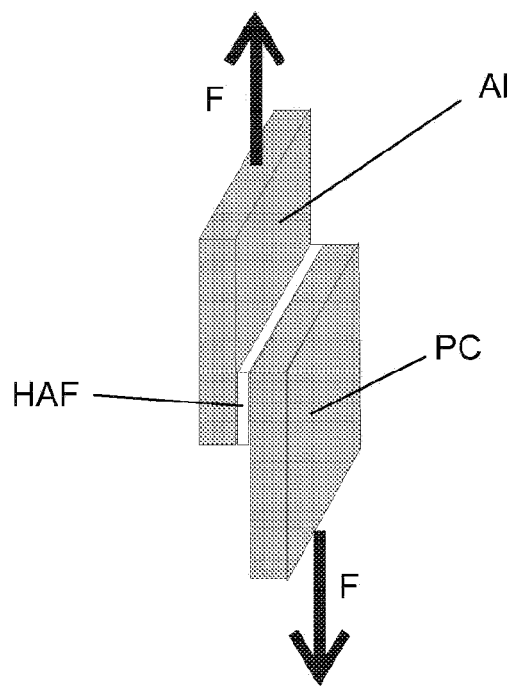

The bond strength is determined by means of a dynamic shearing test. The principle of this measurement is depicted in FIGS. 3a and 3b. An aluminum plate (Al) (thickness: 1.5 mm; width: 2 cm) is joined to a polycarbonate plate (PC) (thickness: 3 mm; width: 2 cm) by means of thermoplastic, heat-activatable sheet (HAF) of the invention (thickness: 150 μm). The bond area is 2 cm².

In a first step, the heat-activatable sheet is laminated onto the aluminum by means of a hot plate (H) at a temperature of 120° C. The release film is subsequently peeled off. The bonding of the test specimens is carried out in a heating press, with heating taking place via the Al side (FIG. 3a). Heat activation is carried out with a heating press ram (S), which is at a temperature of 150° C., under a pressure (p) of 5 bar and in a pressing time of 5 s. Following hot bonding, the quality of the bond (appearance of bubbles) can be assessed through the transparent polycarbonate (PC) (see FIG. 3a).

For testing, the test specimens (assemblies of Al, HAF, and PC) are pulled apart using a tensile testing machine with a testing speed of 10 mm/min (see FIG. 3b). The forces (F) which occur are recorded. The result is reported in N/mm², and represents the maximum force F, relative to the bond area, that is measured for separating the test specimens (Al and PC) from one another. The measurement is carried out at 23° C. and at 50% relative humidity.

Squeezeout Behavior (B)

The thermoplastic, heat-activatable sheet is punched out in the form of a circular diecut having a diameter of 29.5 mm. On both the top face and the bottom face, the sheet is lined with a siliconized glassine liner.

This diecut is subsequently introduced into a heating press and subjected to a pressure of 75 N/cm² at 150° C. (heating press temperature, with heating from both sides) for 10 seconds. As a result of the application of pressure and temperature, the heat-activatable sheet suffers circular squeezeout, leading to an increase in the surface area. The squeezeout rate can be calculated by definition in accordance with the following formula:

$$OR = \frac{Area_{after} - Area_{initial}}{Area_{initial}} \times 100\%$$

OR—the squeezeout rate in %
$Area_{after}$=the area of the thermoplastic after pressing
$Area_{initial}$=the area of the thermoplastic before pressing Drop Test C)

First of all, test specimens are produced in the same way as for measurement method A (bond strength); cf. also FIG. 3a.

Figure 4:
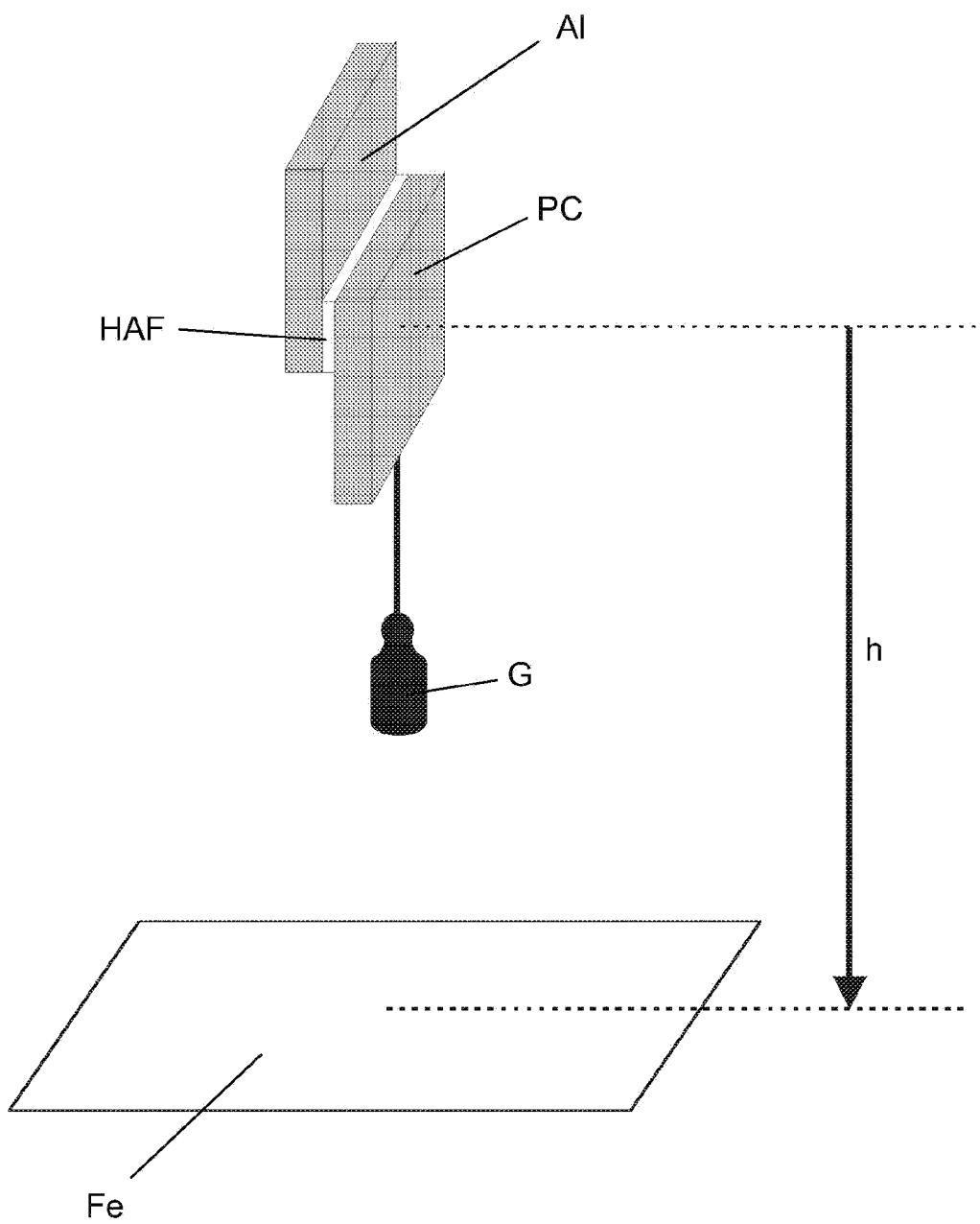
FIG. 4 depicts a drop test.

After this, the drop test is performed (FIG. 4). A weight (G) of 50 g is affixed to the polycarbonate plate (PC). The entire assembly is then dropped from different heights (h) onto a steel plate (Fe) [reference for the drop height: center of gravity of the dropping body comprising the bonded assembly (Al, HAF, PC) and the weight (G)].

A determination is made of the drop height (h) at which the bond with the heat-activatable sheet is still able to absorb the impact, and the bonded assembly comprising the aluminum plate (Al), the heat-activatable sheet (HAF), and the polycarbonate plate (PC) does not fall apart.

The test is conducted at different temperatures.

Samples Investigated

Investigations took place on heat-activatable sheets based on two different heat-activatable adhesives (HA masses), as follows:

HA mass 1: thermoplastic, saturated linear copolyester based on 47% by weight terephthalic acid, 12% by weight isophthalic acid, 9.5% by weight 1,4-butanediol, 31.5% by weight hexanediol melting point 100° C. (DIN 53765); glass transition temperature 10.0° C. (DIN 53765), viscosity 240 000 cP at 160° C. (DIN ISO 1133), melt flow 40.0 g/120 min at 160° C. (DIN ISO 1133)

(commercially available for example from Degussa under the trade name DYNAPOL® S 1227)

HA mass 2: thermoplastic copolyester based on 10.5% by weight adipic acid, 50% by weight terephthalic acid, 13% by weight 1,4-butanediol, 26.5% by weight hexanediol;

melting point 109° C. (DSC, average); glass transition temperature −2° C. (DSC, average), viscosity 650 000 cP at 160° C. (DIN ISO 1133), melt flow 16.0 g/10 min at 160° C. (DIN ISO 1133)

(commercially available for example from EMS Griltech under the trade name Griltex® D 1442E)

Reference Example 1

HA mass 1 was pressed out to 150 µm between two layers of siliconized glassine release paper in a hot press at 140° C. The melting range of the copolyester is between 86° C. and 109° C.

Reference Example 2

HA mass 1 was pressed between two layers of siliconized glassine release paper on both sides on a 13 g/m² fleece (teabag fleece from Glatfelter, cellulose-based) in a hot press at 150° C. The layer thickness of the double-sided adhesive tape without glassine release paper was 150 µm. The melting range of the copolyester is between 86° C. and 109° C.

Example 1

HA mass 1 was pressed out to 65 µm between two layers of siliconized glassine release paper in a hot press at 140° C. The melting range of the copolyester is between 86° C. and 109° C. Then a 13 g/m² fleece (teabag fleece from Glatfelter, cellulose-based) was coated on both sides with the 65 µm thick Dynapol™ S1227. The depth of penetration into the fleece was controlled by means of a heated-roll laminator. Accordingly, this example was laminated at 130° C. with a speed of 2 m/min. The depth of penetration from both sides was determined by SEM micrographs. In this procedure, the average layer thickness of the carrier fleece not penetrated by the hotmelt adhesive was ascertained. This figure is divided by the layer thickness of the carrier fleece in the (unbonded) adhesive sheet assembly, and reported as a percentage. The average degree of saturation is given by 100% minus the defined percentage for the unimpregnated region. In this example, an average degree of saturation of 56% was found.

Example 2

HA mass 1 was pressed out to 65 µm between two layers of siliconized glassine release paper in a hot press at 140° C. The melting range of the copolyester is between 86° C. and 109° C. Then a 13 g/m² fleece (teabag fleece from Glatfelter, cellulose-based) was coated on both sides with the 65 µm thick Dynapol™ S1227. The depth of penetration into the fleece was controlled by means of a heated-roll laminator. Accordingly, this example was laminated at 130° C. with a speed of 0.5 m/min. In the same way as for the mode of determination in example 1, an average degree of saturation of 75% was found.

Reference Example R3

HA mass 2 was pressed out to 150 µm between two layers of siliconized glassine release paper in a hot press at 140° C. The melting range of the polymer is between 93° C. and 121° C.

Reference Example R4

HA mass 2 was pressed between two layers of siliconized glassine release paper on both sides on a 13 g/m² fleece (teabag fleece from Glatfelter, cellulose-based) in a hot press at 150° C. The layer thickness of the double-sided adhesive tape without glassine release paper was 150 µm. The melting range of the copolyester is between 93° C. and 121° C. By means of SEM micrographs, an average degree of saturation of 100% was found, i.e., the specimen had undergone 100% saturation by the hotmelt adhesive.

Example 3

HA mass 2 was pressed out to 65 µm between two layers of siliconized glassine release paper in a hot press at 150° C. The melting range of the copolyester is between 93° C. and 121° C. Then a 13 g/m² fleece (teabag fleece from Glatfelter, cellulose-based) was coated on both sides with the 65 µm thick Grilltex™ 1442 E. The depth of penetration into the fleece was controlled by means of a heated-roll laminator. Accordingly, this example was laminated at 135° C. with a speed of 2 m/min. In the same way as for the mode of determination in example 1, an average degree of saturation of 65% was found.

Example 4

HA mass 2 was pressed out to 65 µm between two layers of siliconized glassine release paper in a hot press at 150° C. The melting range of the copolyester is between 93° C. and 121° C. Then a 13 g/m² fleece (teabag fleece from Glatfelter, cellulose-based) was coated on both sides with the 65 µm thick Grilltex™ 1442 E. In the same way as for the mode of determination in example 1, an average degree of saturation of 80% was found.

Results

Examples 1, 2, 3 and 4 are examples of heat-activatable sheets with the construction according to the invention.

Reference example R1 and reference example R2 are typical embodiments of heat-activatable adhesive sheets with the thermoplastics used in examples 1 and 2, and have the same layer thickness. Reference example R1 does not possess a carrier fleece. In reference example R2, the same carrier fleece as in examples 1 and 2 is used, but in this case is completely saturated.

Reference example R3 and reference example R4 are typical embodiments of heat-activatable adhesive sheets with the thermoplastics used in examples 3 and 4, and have the same layer thickness. Reference example R3 does not possess a carrier fleece. In reference example R4, the carrier fleece used is identical to that in examples 3 and 4, but here is completely saturated.

First of all, on all of the examples, the bond strengths were measured. For this purpose, the procedure according to test method A was adopted. The results are set out in table 1.

TABLE 1

| Examples | Test method A |
|---|---|
| 1 | 5.3 N/mm² |
| 2 | 5.3 N/mm² |
| 3 | 6.5 N/mm² |
| 4 | 6.4 N/mm² |
| Reference example R1 | 6.0 N/mm² |
| Reference example R2 | 5.4 N/mm² |
| Reference example R3 | 7.1 N/mm² |
| Reference example R4 | 6.7 N/mm² |

The results in table 1 demonstrate that the inventive examples have similar bond strengths to the reference examples, especially when the thermoplastics have the same chemical composition.

In a further test, the squeezeout behavior was determined on all of the examples. For this purpose, the procedure according to test method B was adopted. The results are set out in table 2.

TABLE 2

| Examples | Test method B |
|---|---|
| 1 | 23.2 |
| 2 | 21.0 |
| 3 | 15.3 |
| 4 | 16.4 |
| Reference example R1 | 51.9 |
| Reference example R2 | 22.6 |
| Reference example R3 | 45.8 |
| Reference example R4 | 17.4 |

From table 2 it is evident that the inventive construction significantly improves the squeezeout behavior as compared with the reference examples without carriers.

After the adhesive bonding, the examples were subjected to a drop test. The results are set out in table 3. The drop height is indicated in cm in each case.

TABLE 3

| Examples | Test method C at rt | Test method C at −20° |
|---|---|---|
| 1 | 170 cm | 40 cm |
| 2 | 180 cm | 40 cm |
| 3 | >220 cm | 110 cm |
| 4 | >220 cm | 120 cm |
| Reference example R1 | 90 cm | 10 cm |
| Reference example R2 | 110 cm | 15 cm |
| Reference example R3 | 150 cm | 60 cm |
| Reference example R4 | 170 cm | 70 cm |

From table 3 it is evident that inventive examples 1 to 4 have a significantly better shock sensitivity at −20° C. and at room temperature (23° C.) as compared with reference examples R1 to R4. This is reflected in turn in the higher drop height that is possible. Also ascertained is a significant improvement relative to the reference examples with complete saturation of carrier fleece.

The experimental investigations have shown that the inventive examples 1 to 4 allow very high bond strengths, exhibit a reduced squeezeout behavior as compared with thermoplastic, heat-activatable sheets without carriers, and have better shock resistance at room temperature and at −20° C. In a climatic cycling test, furthermore, as a result of the fleece reinforcement, mechanical stresses are more effectively compensated by the different thermal expansion coefficients of the substrates, meaning that bond strengths measured are higher than in the comparison without fleece reinforcement.

It has been shown that the heat-activatable adhesive tapes of the invention are outstandingly suitable for solving the objective problem addressed by the invention and are significantly superior to those of the prior art. An "air cushion" (region not impregnated with adhesive) within the heat-activatable adhesive sheets results in a reduction in the squeezeout behavior and an improvement in the shock absorption capacity.

The invention claimed is:

1. An adhesive sheet comprising a fleece carrier having two sides and a layer of heat-activatable adhesive on each of the two sides of the fleece carrier, wherein both adhesives have penetrated the fleece carrier such that a total of between 40% and 80% of the fiber interstitial volume of the fleece carrier in the adhesive sheet assembly is saturated with adhesive, with the proviso that each adhesive has penetrated a side of the fleece carrier so as to make up at least 10% of the fiber interstitial volume of the fleece carrier in the assembly.

2. The adhesive sheet of claim 1, wherein the adhesives on both sides of the fleece carrier are identical.

3. The adhesive sheet of claim 1, wherein each adhesive has penetrated a side of the fleece carrier so as to make up an equal fraction of the fiber interstitial volume of the fleece carrier in the assembly.

4. An adhesive sheet comprising a fleece carrier having two sides and a layer of heat-activatable adhesive on each of the two sides of the fleece carrier, wherein both adhesives have penetrated the fleece carrier such that a total of between 40% and 80% of the layer thickness of the fleece carrier is saturated with the adhesive, with the proviso that on each side of the fleece carrier at least 10% of the fleece carrier thickness is saturated.

5. The adhesive sheet of claim 1, wherein each heat-activatable adhesive is an adhesive based on one or more thermoplastic polymers.

6. A method of adhesively bonding metal to plastic, glass or metal, said method comprising bonding said metal to said plastic, glass or metal with a heat-activatable adhesive sheet of claim 1.

7. The method of claim 6, which comprises adhesively bonding components of electronic devices.

8. An electronics device comprising components adhesively bonded with a heat-activatable adhesive sheet of claim 1.

9. The adhesive sheet of claim 1, wherein the heat-activatable adhesive is based on a thermoplastic polymer selected from the group consisting of polyesters, copolyesters, polyamides, copolyamides, and thermoplastic polyurethanes.

* * * * *